(12) United States Patent
Horst (10) Patent No.: US 10,858,030 B2
(45) Date of Patent: Dec. 8, 2020

(54) BABY CARRIER WITH A CONVERTIBLE SEAT FRAME

(71) Applicant: Wonderland Switzerland AG, Steinhausen (CH)

(72) Inventor: Andrew Horst, West Lawn, PA (US)

(73) Assignee: Wonderland Switzerland AG, Steinhausen (CH)

( * ) Notice: Subject to any disclaimer, the term of this patent is extended or adjusted under 35 U.S.C. 154(b) by 303 days.

(21) Appl. No.: 16/021,044

(22) Filed: Jun. 28, 2018

(65) Prior Publication Data
US 2019/0023302 A1 Jan. 24, 2019

Related U.S. Application Data

(60) Provisional application No. 62/533,708, filed on Jul. 18, 2017.

(51) Int. Cl.
| | |
|---|---|
| *B62B 9/10* | (2006.01) |
| *B62B 9/12* | (2006.01) |
| *B62B 7/14* | (2006.01) |
| *B62B 9/24* | (2006.01) |
| *B62B 9/14* | (2006.01) |

(52) U.S. Cl.
CPC ............ *B62B 9/104* (2013.01); *B62B 7/147* (2013.01); *B62B 9/102* (2013.01); *B62B 9/12* (2013.01); *B62B 9/142* (2013.01); *B62B 9/14* (2013.01); *B62B 9/245* (2013.01)

(58) Field of Classification Search
CPC B62B 9/102; B62B 9/104; B62B 9/24; B62B 9/245; B62B 7/147
See application file for complete search history.

(56) References Cited

U.S. PATENT DOCUMENTS

| 4,072,318 | A | * | 2/1978 | Laune | ................... B62B 7/147 |
|---|---|---|---|---|---|
| | | | | | 280/42 |
| 4,398,748 | A | * | 8/1983 | Duvignacq | .............. B62B 7/08 |
| | | | | | 280/644 |
| 4,449,732 | A | * | 5/1984 | Surot | ..................... B62B 7/068 |
| | | | | | 280/47.36 |
| 4,538,830 | A | * | 9/1985 | Nakao | ..................... B62B 7/06 |
| | | | | | 280/647 |

(Continued)

FOREIGN PATENT DOCUMENTS

WO WO-2007138358 A2 * 12/2007 ............ B62B 7/147

*Primary Examiner* — Katy M Ebner
(74) *Attorney, Agent, or Firm* — Winston Hsu (57) ABSTRACT

The present application provides a baby carrier with a convertible seat frame which includes a stroller frame, a stroller frame mount, the resting member, and the seat frame. The seat frame is pivotally mounted to the stroller frame mount so as to pivot between a seat mode and a lay-flat mode relative to the stroller frame. By fixing the resting member to the stroller frame mount mounted to the stroller frame to form a firm integral, the resting member does not pivot along with the seat frame pivoting. The resting member stays at a designated horizontal position when the seat frame pivots independently of the resting member. Therefore, the resting member does not intervene between caregivers and the child in the baby carrier so that a space substantially above the seat frame is kept clear for ease access to the child in the baby carrier.

9 Claims, 7 Drawing Sheets (56) References Cited

U.S. PATENT DOCUMENTS

| | | | | |
|---|---|---|---|---|
| 5,123,767 | A * | 6/1992 | Ishikura | B62B 9/245 |
| | | | | 280/47.38 |
| 5,201,535 | A * | 4/1993 | Kato | B62B 7/123 |
| | | | | 280/30 |
| 7,789,402 | B2 * | 9/2010 | Saville | B62B 7/123 |
| | | | | 280/47.38 |
| 8,322,744 | B2 * | 12/2012 | Ahnert | B62B 9/20 |
| | | | | 280/47.4 |
| 8,672,341 | B2 * | 3/2014 | Offord | B62B 7/008 |
| | | | | 280/650 |
| 9,221,487 | B2 * | 12/2015 | Doucette | B62B 7/00 |
| 9,302,695 | B2 * | 4/2016 | Hartenstine | B62B 3/022 |
| 9,399,477 | B2 * | 7/2016 | Iftinca | B62B 7/06 |
| 9,517,786 | B2 * | 12/2016 | Chang | B62B 7/08 |
| 10,407,090 | B2 * | 9/2019 | Driessen | B62B 9/104 |
| 2014/0062146 | A1 * | 3/2014 | Haut | B62B 7/00 |
| | | | | 297/183.1 |
| 2016/0128491 | A1 * | 5/2016 | Martiniuk | B62B 9/24 |
| | | | | 280/47.41 |
| 2018/0162437 | A1 * | 6/2018 | Mostert | B62B 9/102 |
| 2019/0176866 | A1 * | 6/2019 | Day | B62M 1/38 |
| 2019/0256120 | A1 * | 8/2019 | Oakes | B62B 7/08 |

\* cited by examiner

BABY CARRIER WITH A CONVERTIBLE SEAT FRAME

CROSS REFERENCE TO RELATED APPLICATIONS

This application claims the benefit of U.S. Provisional Patent Application No. 62/533,708, filed on Jul. 18, 2017, which is hereby incorporated by reference in its entirety.

BACKGROUND OF THE INVENTION

1. Field of the Invention

The invention relates to a baby carrier, and more particularly, to a baby carrier with a convertible seat frame pivoting independently of the resting member.

2. Description of the Prior Art

A conventional baby carrier has a recline system that adjusts a seat frame of the baby carrier from a mostly upright position to a slightly shallower angle for allowing a child seated in a seat to sleep in a more comfortable posture. Specifically, the child in the seat is seated on a cushion, and the cushion is anchored and held by a lower seat pan connected to the seat frame. Since the lower seat pan is usually unable to be easily adjusted in accordance with the seat frame, the converted seat frame does not provide a truly flat sleeping surface (i.e. a bed surface) on the cushion.

To address the aforementioned issue, some conventional baby carriers have seat frames that can be converted from a seat mode, such as a mostly upright position, to a lay-flat mode by adjusting the seat frame entirely and reconfiguring the lower seat pan and the cushion so as to create a flat sleeping surface on the cushion. However, when the seat frame is converted from the seat mode to the lay-flat mode, a resting member, such as a child's tray or an arm bar, rotates along with the seat frame. However, the structural design of the resting member rotating along with the seat frame limits the ease of access to the child especially at the lay-flat mode. Therefore, it is important to design a configuration of the resting member and the seat frame which avoids the aforementioned problem.

SUMMARY OF THE INVENTION

Therefore, it is an objective of the present invention to provide a baby carrier with a convertible seat frame such that the seat frame is capable of pivoting between a seat mode and a lay-flat mode independently of the resting member.

In order to achieve the aforementioned objective, the present invention discloses a baby carrier including a stroller frame, a stroller frame mount, a resting member, and a seat frame. The stroller frame mount is installed on the stroller frame. The resting member is fixed to the stroller frame mount. The seat frame is pivotally mounted to the stroller frame mount so as to pivot between a seat mode and a lay-flat mode relative to the stroller frame and independently of the resting member.

According to an embodiment of the present invention, the resting member remains in a horizontal position when the seat frame pivots relative to the stroller frame.

According to an embodiment of the present invention, the seat frame and the resting member are aligned horizontally when the seat frame is located at the lay-flat mode.

According to an embodiment of the present invention, the seat frame is oblique relative to the resting member when the seat frame is located at the seat mode.

According to an embodiment of the present invention, the baby carrier further includes a seat frame reclining mechanism and a reclining release actuator. The seat frame reclining mechanism is connected to the seat frame and is for reclining the seat frame relative to the resting member between the seat mode and the lay-flat mode. The reclining release actuator is connected to the seat frame reclining mechanism and is for releasing the seat frame reclining mechanism.

According to an embodiment of the present invention, the reclining release actuator is installed at a foot end of the seat frame.

According to an embodiment of the present invention, the baby carrier further includes a seat frame pivot connected to the stroller frame mount. The seat frame includes an upper frame portion and a lower frame portion. The upper frame portion and the lower frame portion pivot relative to the stroller frame mount via the seat frame pivot.

According to an embodiment of the present invention, the baby carrier further includes a seat pan frame connected to the seat frame pivot and rotating with the seat frame and adapted for anchoring a cushion.

According to an embodiment of the present invention, the baby carrier further includes a canopy pivot and a canopy. The canopy pivot is connected to the stroller frame mount. The canopy pivots relative to the stroller frame mount via the canopy pivot and for covering the seat frame.

According to an embodiment of the present invention, the canopy pivot is coaxial with the seat frame pivot.

According to an embodiment of the present invention, the resting member is a tray or an arm bar.

In summary, by fixing the resting member to the stroller frame mount mounted to the stroller frame to form a firm integral structure, the resting member does not pivot along with the seat frame pivoting between the seat mode and the lay-flat mode. The resting member stays at a designated working position (i.e. usually a horizontal position) when the seat frame pivots relative to the stroller frame and independently of the resting member. Therefore, the resting member does not intervene between caregivers and the child in the baby carrier so that a space substantially above the seat frame is kept clear for ease access to the child in the baby carrier.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
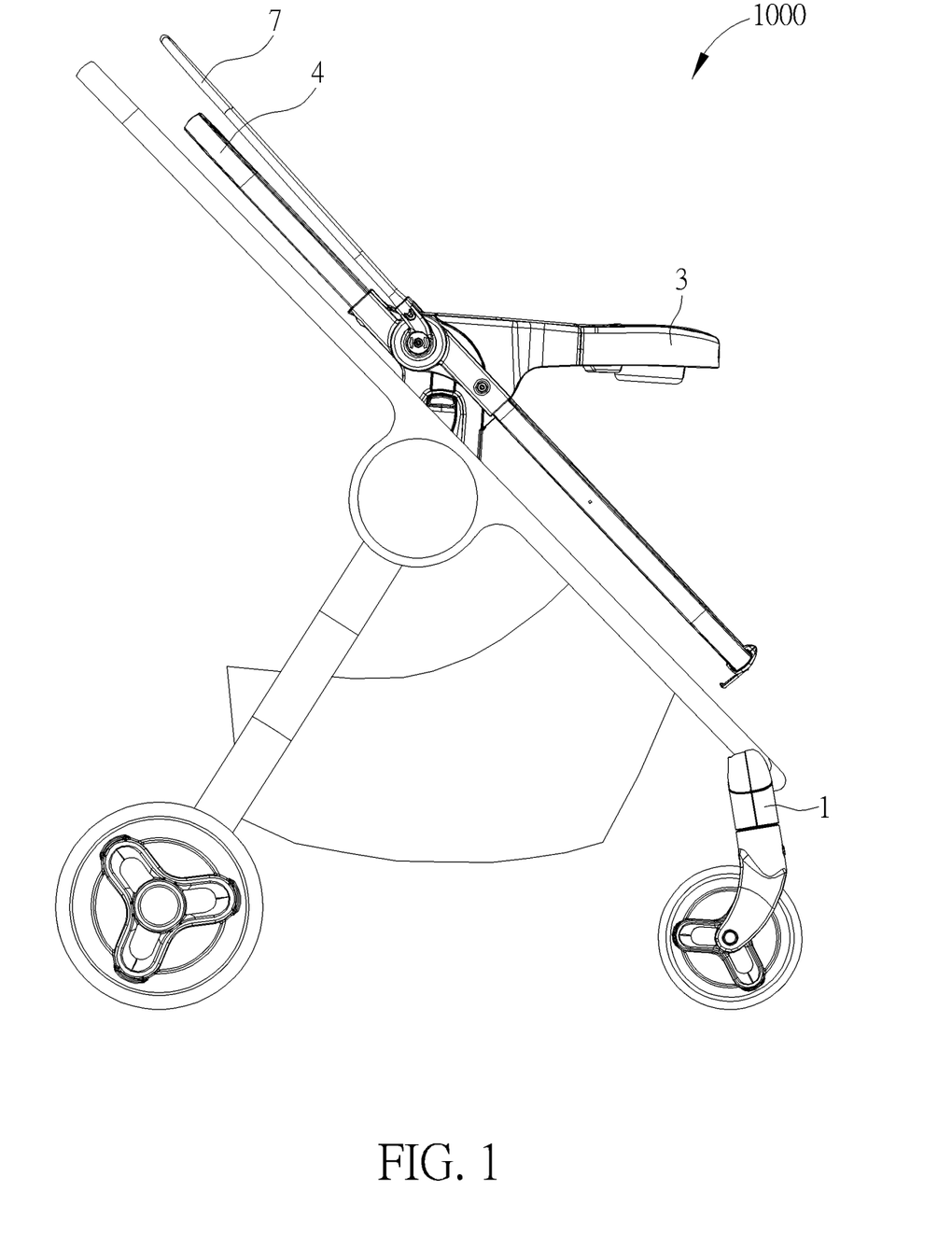
FIG. 1 is a schematic diagram of a baby carrier according to an embodiment of the present application.
Figure 2:
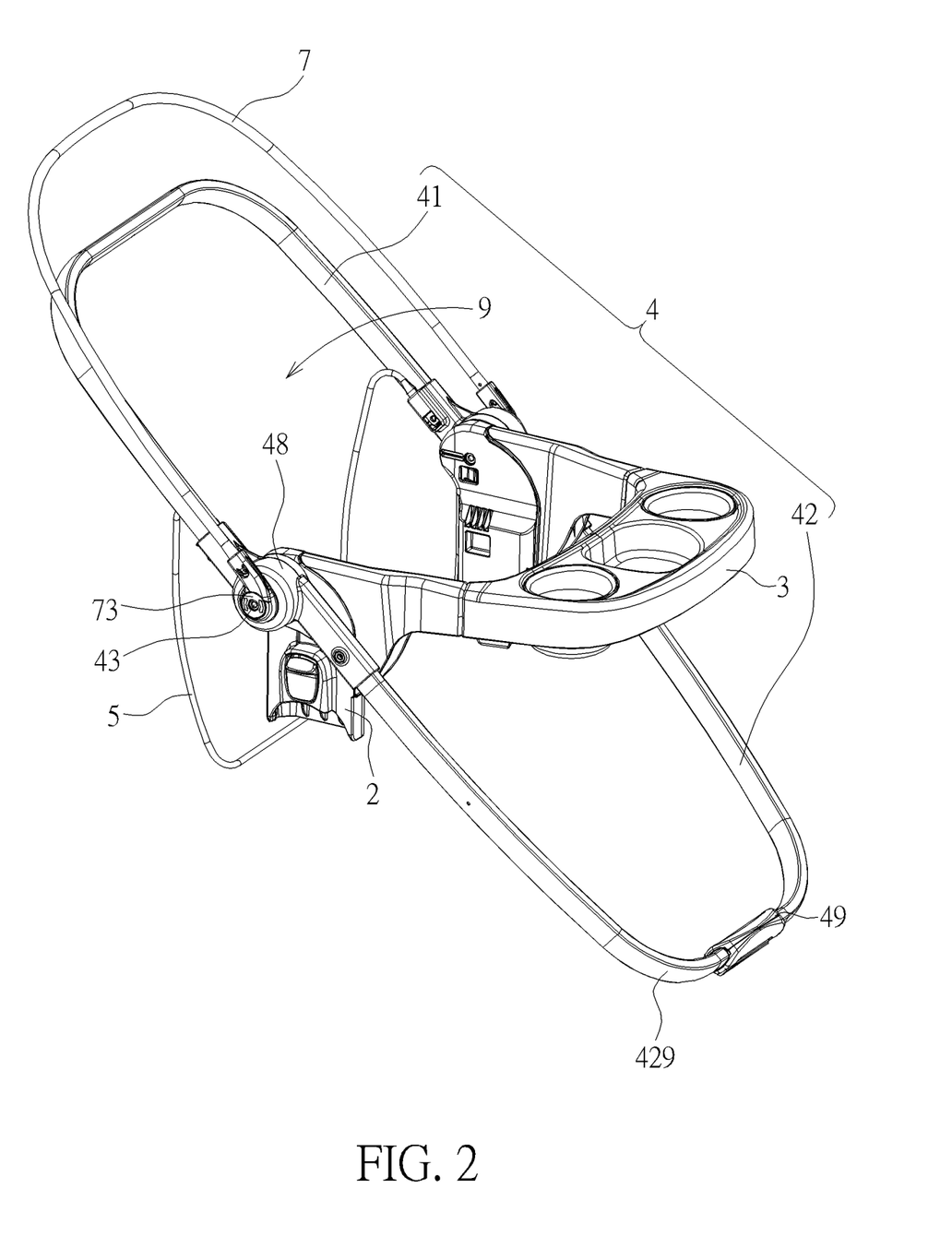
FIG. 2 is a schematic diagram of the baby carrier located at a seat mode according to the embodiment of the present application.
Figure 3:
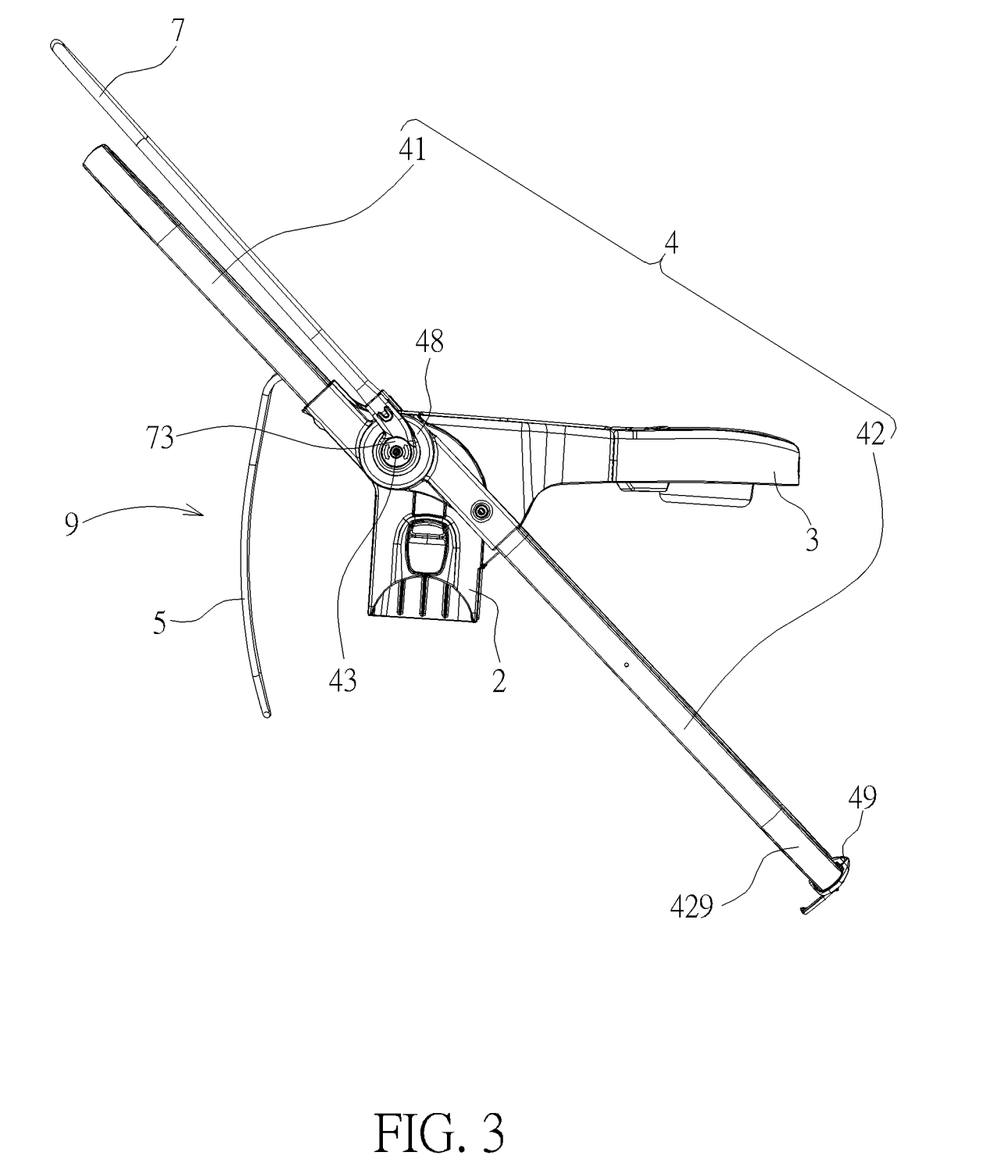
FIG. 3 is a side view of the baby carrier located at the seat mode according to the embodiment of the present application.
Figure 4:
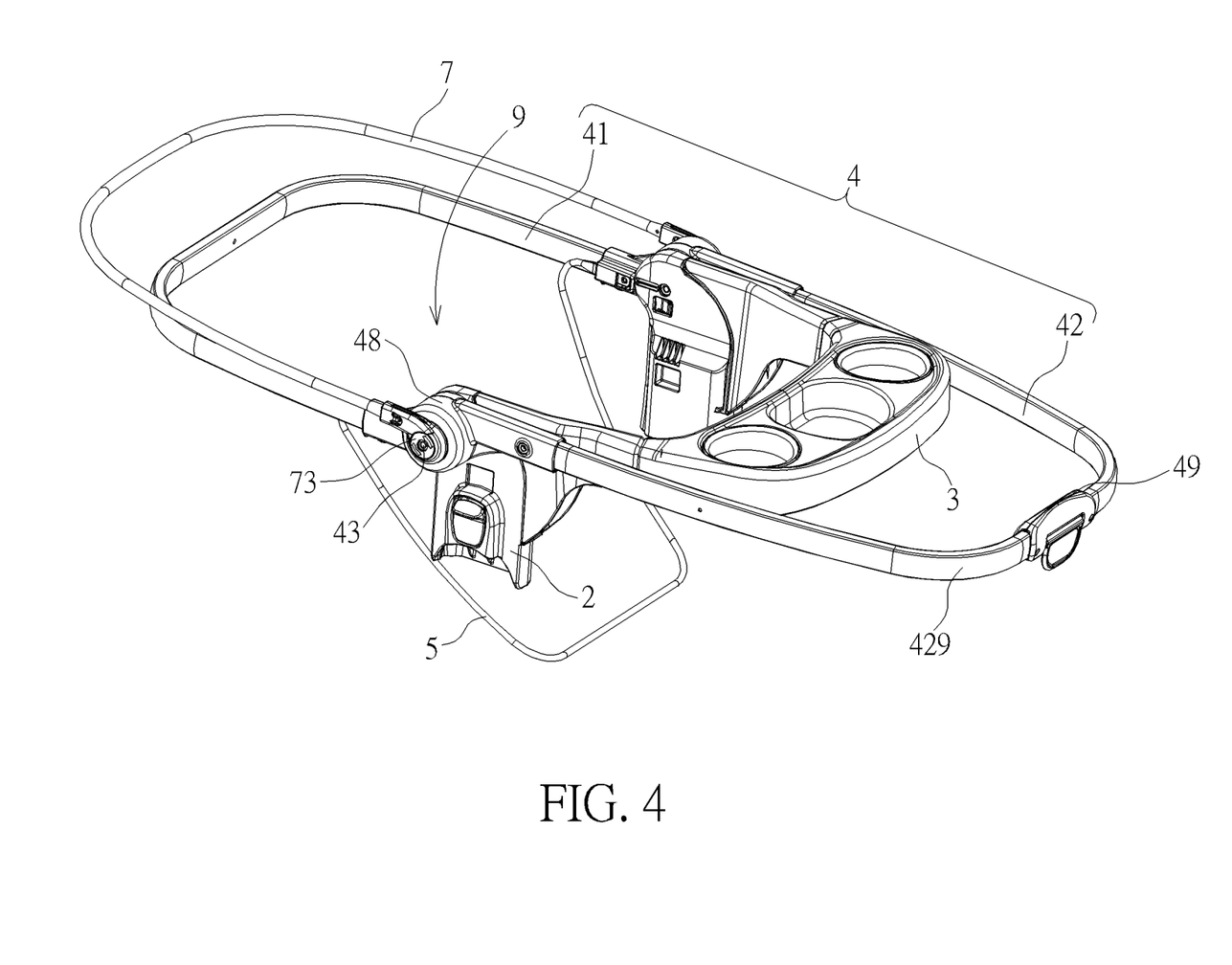
FIG. 4 is a schematic diagram of the baby carrier located at a lay-flat mode according to the embodiment of the present application.
Figure 5:
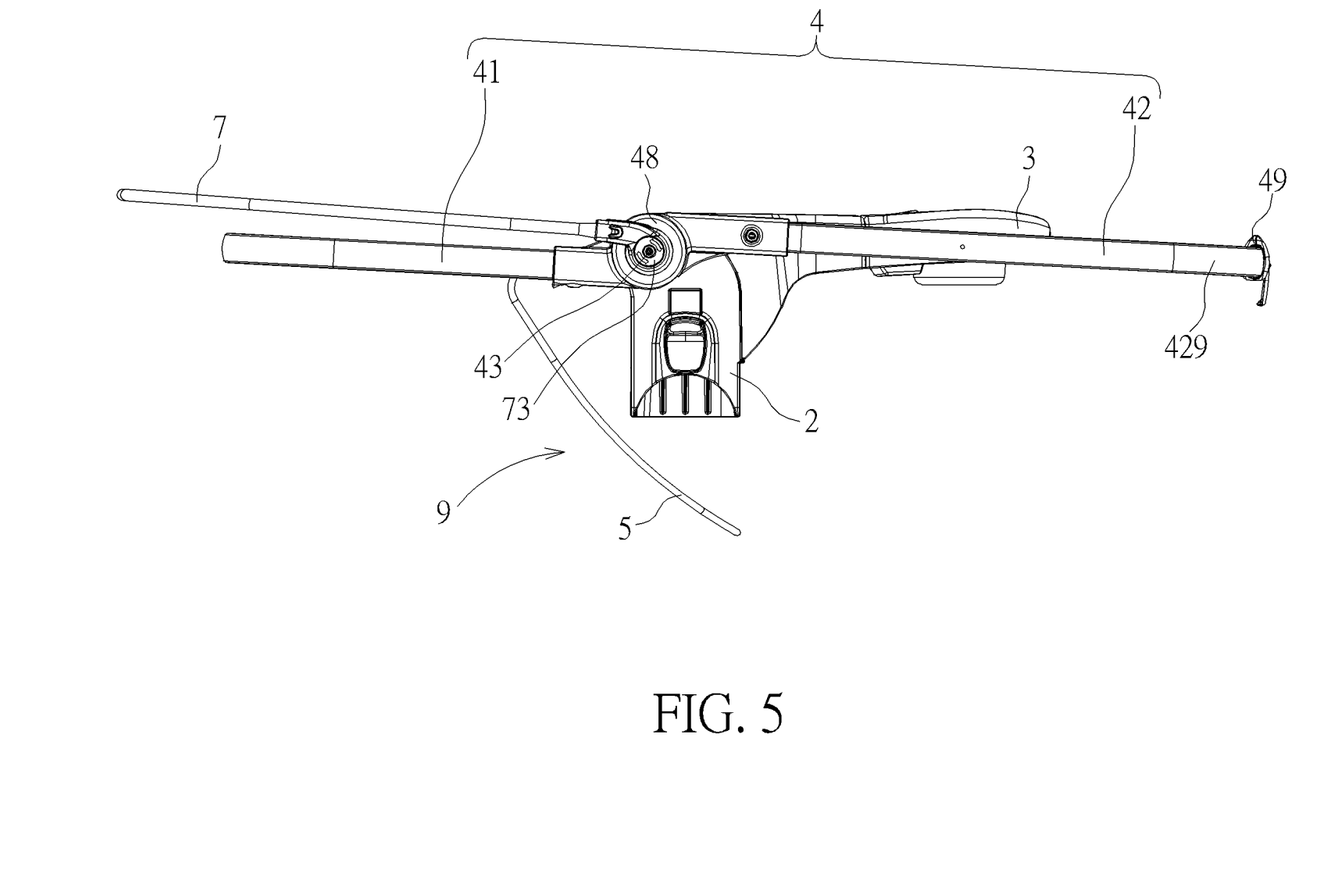
FIG. 5 is a side view of the baby carrier located at the lay-flat mode according to the embodiment of the present application.

Please refer to FIG. 1 to FIG. 5. FIG. 1 is a schematic diagram of a baby carrier 1000 according to an embodiment of the present application. FIG. 2 is a schematic diagram of the baby carrier 1000 located at a seat mode according to the embodiment of the present application. FIG. 3 is a side view of the baby carrier 1000 located at the seat mode according to the embodiment of the present application. FIG. 4 is a schematic diagram of the baby carrier 1000 located at a lay-flat mode according to the embodiment of the present application. FIG. 5 is a side view of the baby carrier 1000 located at the lay-flat mode according to the embodiment of the present application. The baby carrier 1000 includes a stroller frame 1, a stroller frame mount 2, a resting member 3, and a seat frame 4. The stroller frame mount 2 is installed on the stroller frame 1. The resting member 3 is fixed to the stroller frame mount 2. The seat frame 4 is pivotally mounted to the stroller frame mount 2 so as to pivot between the seat mode (as shown in FIG. 2 and FIG. 3) and the lay-flat mode (as shown in FIG. 4 and FIG. 5) relative to the stroller frame 1 and independently of the resting member 3. For example, since the resting member 3 and the stroller frame mount 2 are fixed to each other and installed on the stroller frame 1 to form an integral, the assembly of the resting member 3, the stroller frame mount 2, and the stroller frame 1 can be regarded as a substantially rigid body, and thereby the resting member 3 can remain in a substantially horizontal position when the seat frame 4 pivots relative to the stroller frame 1. The resting member 3 can be, but is not limited to, a tray, an arm bar, or any platform-like or bar-like part for putting articles thereon or resting arms thereon.

As shown in FIG. 2 and FIG. 3, the seat frame 4 is oblique relative to the resting member 3 when the seat frame 4 is located at the seat mode, and the resting member 3 is remained in a substantially horizontal position. When the seat frame 4 is converted to the lay-flat mode, as shown in FIG. 4 and FIG. 5, the seat frame 4 and the resting member 3 are aligned horizontally. That is, for a child being seated in a accommodating space 9 provided by the seat frame 4, the child faces vertically towards a top side (i.e. skyward) of the seat frame 4 when the seat frame 4 is located at the lay-flat mode. Since the resting member 3 remained horizontally does not protrude in any direction into the top side of the seat frame 4, the present application provides a cleared space above the seat frame 4 for ease access to the child without any interference when the seat frame 4 is located at the lay-flat mode.

In practical application, the baby carrier 1000 can further include a seat frame pivot 43 connected to the stroller frame mount 2. The seat frame 4 can include an upper frame portion 41 and a lower frame portion 42, and the upper frame portion 41 and the lower frame portion 42 pivot relative to the stroller frame mount 2 via the seat frame pivot 43. That is, the upper frame portion 41 and the lower frame portion 42 composing the seat frame 4 are pivotally mounted to the stroller frame mount 2 via the seat frame pivot 43 so as to pivot together or to pivot respectively, and the configuration of the upper frame portion 41 and the lower frame portion 42 is not limited to the aforementioned embodiment. It should be noticed that the seat frame pivot 43 can be fixed to or pivotally mounted to the stroller frame mount 2, and the configuration of the seat frame pivot 43 is not limited to the aforementioned embodiment. An end of the resting member 3 and an end of the stroller frame mount 2 can be connected (or fixed to each other) at a position adjacent to the seat frame pivot 43. In another embodiment, the seat frame pivot 43 can be mounted to the resting member 3 which is rigidly attached to the stroller frame mount 2, and layout between the resting member 3, the stroller frame mount 2, and the seat frame pivot 43 is not limited by the aforementioned embodiments.

As shown in FIG. 2, FIG. 3, FIG. 4, and FIG. 5, the baby carrier 1000 can further include a seat frame reclining mechanism 48 and a reclining release actuator 49. The seat frame reclining mechanism 48 is connected to the seat frame 4 and for reclining the seat frame 4 relative to the resting member 3 between the seat mode and the lay-flat mode. The reclining release actuator 49 is connected to the seat frame reclining mechanism 48 and for releasing the seat frame reclining mechanism 48. For example, the seat frame reclining mechanism 48 and the recline release actuator can be interconnected with the seat frame 4 (and with the seat frame pivot 43) via wires, linkage bars, gears, electrical connection, or any other connection methods for actuating or stopping the reclining movement of the seat frame 4 between the seat mode and the lay-flat mode. The recline release actuator 49 can be installed at a foot end 429 of the seat frame 4 for ease of the caregiver (as shown in FIG. 2 and FIG. 3) or any other locations, and layout of the recline release actuator 49 is not limited to the aforementioned embodiment.

As shown in FIG. 2, FIG. 3, FIG. 4, and FIG. 5, the baby carrier 1000 can further include a canopy pivot 73 and a canopy 7. The canopy pivot 73 is connected to the stroller frame mount 2. The canopy 7 pivots relative to the stroller frame mount 2 via the canopy pivot 73 and is for covering the seat frame 4. That is, the canopy 7 is able to provide maximum coverage for the child seating in the baby carrier 1000 when being expanded. The canopy pivot 73 can be coaxial with the seat frame pivot 43 so that the canopy 7 and the seat frame 4 could pivot together relative to the stroller frame mount 2 when the seat frame 4 is converted between the seat mode and the lay-flat mode. In other embodiments, the canopy 7 and the seat frame 4 can pivot respectively or the canopy pivot 73 and the seat frame pivot 43 can be not coaxial, and configuration between the canopy pivot 73 and the seat frame pivot 43 is not limited to the aforementioned embodiments.

Figure 6:
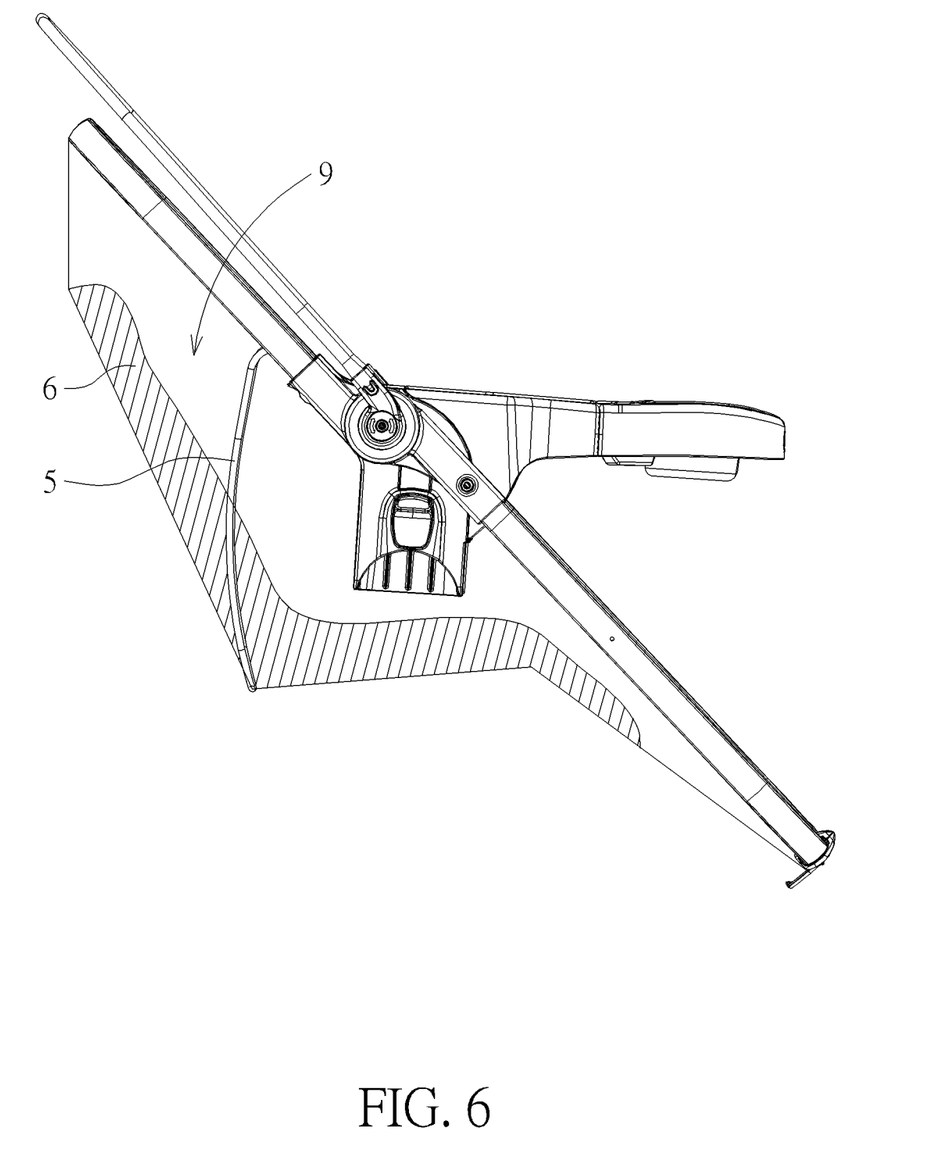
FIG. 6 is a diagram of a seat pan frame located at the seat mode according to the embodiment of the present application.
Figure 7:
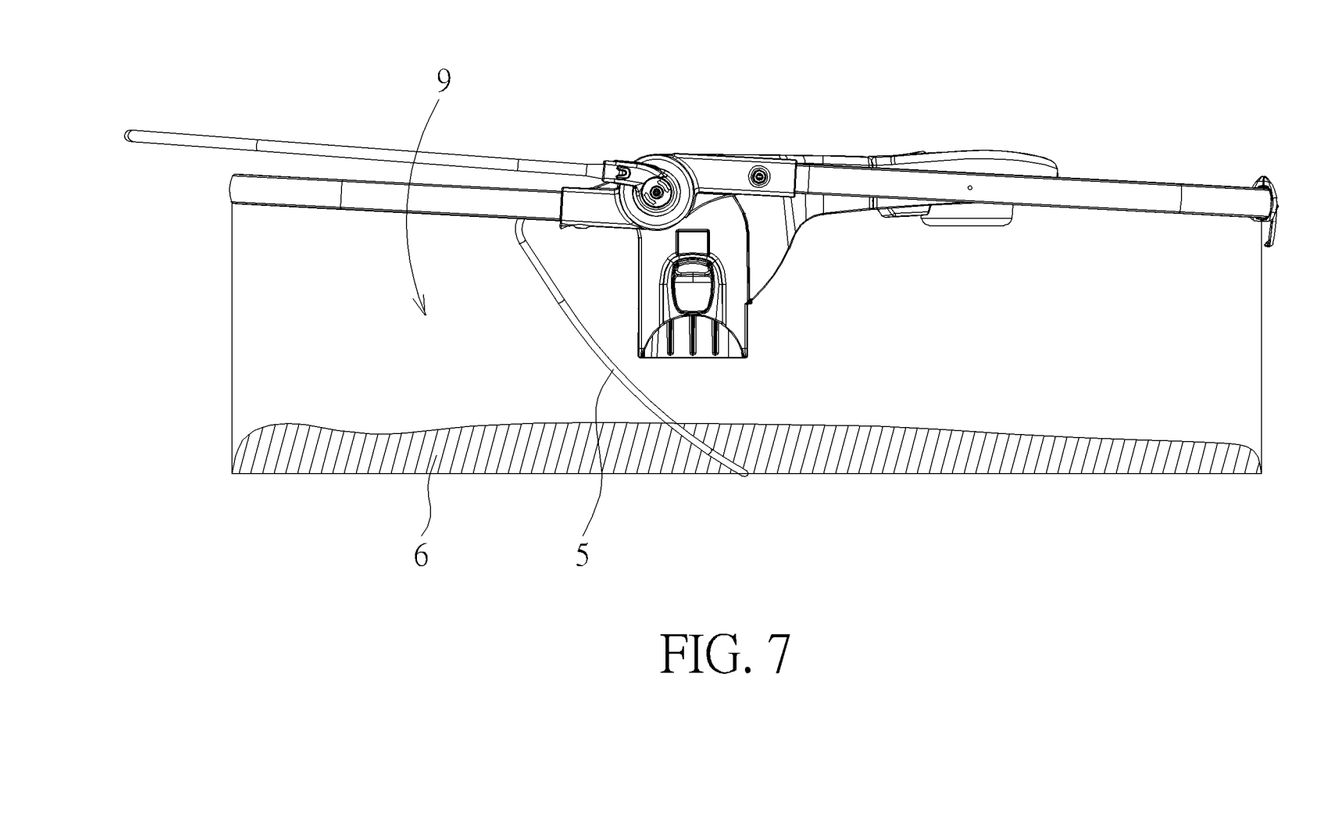
FIG. 7 is a diagram of the seat pan frame located at the lay-flat mode according to the embodiment of the present application.

Please refer to FIG. 2, FIG. 3, FIG. 4, FIG. 5, FIG. 6, and FIG. 7. FIG. 6 is a diagram of a seat pan frame 5 located at the seat mode according to the embodiment of the present application. FIG. 7 is a diagram of the seat pan frame 5 located at the lay-flat mode according to the embodiment of the present application. The baby carrier 1000 can further include the seat pan frame 5 connected to the seat frame pivot 43. The seat pan frame 5 rotates with the seat frame 4 and is adapted for securely anchoring a cushion 6. In practical application, the seat frame 1 and the seat pan frame 5 define the accommodating space 9, and the cushion 6 is disposed inside the accommodating space 9 and is supported by the seat pan frame 5 and the seat frame 4 for providing the child with a comfortable buffer. A shape of the cushion 6 can be adjusted in accordance with the modes where the seat frame 4 is located. As shown in FIG. 6, the cushion 6 is adjusted to a mostly upright configuration for holding the child in a comfortable seating posture when the seat frame 4 and the seat pan frame 5 is located at the seat mode. As shown in FIG. 7, the cushion 6 is adjusted to provide a flat sleeping surface for the child lying on the cushion 6 when the seat frame 4 and the seat pan frame 5 are at the lay-flat mode.

In summary, by fixing the resting member to the stroller frame mount mounted to the stroller frame to forma firm integral structure, the resting member does not pivot along with the seat frame pivoting between the seat mode and the lay-flat mode. The resting member stays at a designated working position (i.e. usually a horizontal position) when the seat frame pivots relative to the stroller frame and independently of the resting member. Therefore, the resting member does not intervene between caregivers and the child in the baby carrier so that a space substantially above the seat frame is kept clear for ease access to the child in the baby carrier.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A baby carrier comprising:
   a stroller frame;
   a stroller frame mount installed on the stroller frame;
   a resting member fixed to the stroller frame mount;
   a seat frame pivot connected to the stroller frame mount;
   a seat frame pivotally mounted to the stroller frame mount so as to pivot between a seat mode and a lay-flat mode relative to the stroller frame and independently of the resting member, the seat frame comprising an upper frame portion and a lower frame portion, the upper frame portion and the lower frame portion being pivotally connected to each other and to the stroller frame mount by the seat frame pivot, the upper frame portion and the lower frame portion pivoting relative to the stroller frame mount via the seat frame pivot together or respectively;
   a canopy pivot connected to the stroller frame mount, the canopy pivot being coaxial with the seat frame pivot; and
   a canopy pivoting relative to the stroller frame mount via the canopy pivot and for covering the seat frame.

2. The baby carrier of claim 1, wherein the resting member remains in a horizontal position when the seat frame pivots relative to the stroller frame.

3. The baby carrier of claim 2, wherein the seat frame and the resting member are aligned horizontally when the seat frame is located at the lay-flat mode.

4. The baby carrier of claim 2, wherein the seat frame is oblique relative to the resting member when the seat frame is located at the seat mode.

5. The baby carrier of claim 1, further comprising:
   a seat frame reclining mechanism connected to the seat frame and for reclining the seat frame relative to the resting member between the seat mode and the lay-flat mode; and
   a reclining release actuator connected to the seat frame reclining mechanism and for releasing the seat frame reclining mechanism.

6. The baby carrier of claim 5, wherein the reclining release actuator is installed at a foot end of the seat frame.

7. The baby carrier of claim 1, further comprising a seat pan frame connected to the seat frame pivot and rotating with the seat frame and adapted for anchoring a cushion.

8. The baby carrier of claim 1, wherein an end of the resting member and an end of the stroller frame mount are connected at a position adjacent to the seat frame pivot.

9. The baby carrier of claim 1, wherein the resting member is a tray or an arm bar.

* * * * *